(12) United States Patent
Mistry et al.

(10) Patent No.: US 7,965,717 B2
(45) Date of Patent: Jun. 21, 2011

(54) MULTI-STAGED SERVICES POLICING

(75) Inventors: Nalin Mistry, Nepean (CA);
Abdulkadev Barbir, Nepean (CA);
Wayne Ding, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 2062 days.

(21) Appl. No.: 10/645,489

(22) Filed: Aug. 22, 2003

(65) Prior Publication Data

US 2004/0141462 A1    Jul. 22, 2004

Related U.S. Application Data

(60) Provisional application No. 60/440,625, filed on Jan. 17, 2003.

(51) Int. Cl.
*H04L 12/26* (2006.01)
*H04L 1/00* (2006.01)
*H04J 1/16* (2006.01)
*H04J 3/14* (2006.01)
*G08C 15/00* (2006.01)

(52) U.S. Cl. ............... 370/395.1; 370/229; 370/235; 709/223

(58) Field of Classification Search .......... 370/229–252, 370/389–401, 463–477; 709/217–226, 232–245
See application file for complete search history.

(56) References Cited

U.S. PATENT DOCUMENTS

| | | | |
|---|---|---|---|
| 5,953,317 A * | 9/1999 | Ogasawara et al. ........... 370/232 |
| 6,072,989 A * | 6/2000 | Witters et al. .............. 455/67.11 |
| 6,404,737 B1 | 6/2002 | Novick et al. |
| 6,463,068 B1 * | 10/2002 | Lin et al. ........................ 370/414 |
| 6,614,790 B1 * | 9/2003 | Veres et al. ................. 370/395.2 |
| 6,618,356 B1 * | 9/2003 | Bonaventure ................. 370/235 |
| 6,633,540 B1 * | 10/2003 | Raisanen et al. ............ 370/230.1 |
| 6,680,933 B1 * | 1/2004 | Cheesman et al. ............ 370/352 |
| 6,822,940 B1 * | 11/2004 | Zavalkovsky et al. ........ 370/237 |
| 6,901,052 B2 * | 5/2005 | Buskirk et al. ................ 370/235 |
| 6,981,052 B1 * | 12/2005 | Cheriton ....................... 709/232 |
| 7,027,394 B2 * | 4/2006 | Gupta et al. ............... 370/230.1 |
| 7,054,930 B1 * | 5/2006 | Cheriton ....................... 709/226 |
| 7,065,084 B2 * | 6/2006 | Seo ................................ 370/392 |
| 7,069,337 B2 * | 6/2006 | Rawlins et al. ............... 709/238 |
| 7,106,731 B1 * | 9/2006 | Lin et al. ....................... 370/389 |
| 7,123,583 B2 * | 10/2006 | Hoar et al. .................... 370/230 |
| 7,130,917 B2 * | 10/2006 | Zhang et al. .................. 709/234 |
| 7,155,502 B1 * | 12/2006 | Galloway et al. ............. 709/223 |
| 7,215,637 B1 * | 5/2007 | Ferguson et al. .......... 370/230.1 |
| 7,215,674 B1 * | 5/2007 | Vyas et al. ................. 370/395.2 |
| 7,227,840 B1 * | 6/2007 | Ferguson et al. ............. 370/230 |
| 7,266,606 B2 * | 9/2007 | Ganti et al. ................... 709/226 |
| 7,328,274 B2 * | 2/2008 | Zhang et al. .................. 709/234 |
| 7,385,954 B2 * | 6/2008 | Gopalakrishnan et al. ... 370/335 |
| 7,480,706 B1 * | 1/2009 | Hooper et al. ................ 709/223 |

(Continued)

FOREIGN PATENT DOCUMENTS

WO    WO-02-30064 A1    4/2002

*Primary Examiner* — Man Phan (74) *Attorney, Agent, or Firm* — Withrow & Terranova, PLLC (57) ABSTRACT

A multi-staged services policer implements multiple policies, at an edge device of network, on the data traffic of a single customer. In such a multi-staged services policer, services policers in a given stage may receive information from policers in subsequent stages. This information may be used when policing in the given stage.

18 Claims, 3 Drawing Sheets

U.S. PATENT DOCUMENTS

| | | | |
|---|---|---|---|
| 7,499,400 B2 * | 3/2009 | Davies et al. | 370/235 |
| 7,609,634 B2 * | 10/2009 | Chow | 370/232 |
| 7,751,402 B2 * | 7/2010 | Wolrich et al. | 370/394 |
| 2002/0191543 A1 | 12/2002 | Buskirk et al. | |
| 2004/0068577 A1 * | 4/2004 | Ruutu | 709/236 |
| 2005/0157728 A1 * | 7/2005 | Kawano et al. | 370/395.21 |
| 2006/0265514 A1 * | 11/2006 | Zhang et al. | 709/232 |
| 2007/0086483 A1 * | 4/2007 | Greenberg | 370/468 |
| 2008/0025218 A1 * | 1/2008 | Liu | 370/235 |
| 2008/0192636 A1 * | 8/2008 | Briscoe et al. | 370/236 |
| 2008/0219160 A1 * | 9/2008 | Trinh et al. | 370/230 |
| 2009/0109847 A1 * | 4/2009 | Stephenson et al. | 370/232 |

* cited by examiner

MULTI-STAGED SERVICES POLICING

CROSS REFERENCE TO RELATED APPLICATIONS

The present application claims the benefit of prior provisional application Ser. No. 60/440,625, filed Jan. 17, 2003.

FIELD OF THE INVENTION

The present invention relates to services policing in data communications networks and, in particular, to multi-staged services policing.

BACKGROUND

A provider of data communications services typically provides a customer access to a large data communication network. This access may be provided at an "edge device" that connects a customer network to the large data communication network. The edge device may be, for instance, a router or a switch. As such service providers have a broad range of customers with a broad range of needs, the service providers prefer to charge for their services in a manner consistent with which the services are being used. Such an arrangement also benefits the customer. To this end, a Service Level Agreement (SLA) is typically negotiated between customer and service provider.

According to searchWebServices.com, an SLA is a contract between a network service provider and a customer that specifies, usually in measurable terms, what services the network service provider will furnish. In order to enforce the SLA, these service providers often rely on "policing".

Policing involves the inspection of traffic and then the taking of an action based on various characteristics of that traffic. These characteristics may be, for instance, based on whether the traffic is over or under a given rate, or based on some bits in the headers of the traffic. Such bits may include a Differentiated Services Code Point (DSCP) or an indication of "IP Precedence". Although a "policer" (that which implements policing) may be a software element, today most policers are implemented in hardware. However, newer technologies are implementing policers as a combination of hardware and firmware. Such an implementation allows for high performance and high scalability to support thousands of flows and/or connections.

A policer may either discard a packet of traffic or modify some aspect of the packet of traffic, such as the Internet Protocol (IP) Precedence of the packet of traffic, when it is determined, by the policer, that the packet of traffic meets a given criterion. As an example, the policer can police based on such traffic attributes as the aggregate maximum bandwidth allowed for a set of flows, the maximum bandwidth allowed for each single flow, number of flows allowed and special treatment to be applied to any excess traffic.

Historically, service providers could furnish a customer with a dedicated point-to-point connection to, for instance, connect a branch office to a main office. However, service providers have been evolving to offer leased line connections over shared network infrastructure. That is, a dedicated line is used from one end point of the leased line (the customer network) to the service provider edge device, but the service provider uses a shared network to connect to the other end point of the leased line. This is often accomplished using Layer 2 technologies like Frame Relay and Asynchronous Transfer Mode (ATM). "Layer 2" is the Data Link layer of the commonly-referenced multi-layered communication model, Open Systems Interconnection (OSI).

With the use of these Layer 2 technologies, policing has become an important tool at service providers' edge devices for enforcement of SLAs, avoidance of Denial of Service (DoS) attacks and careful and accurate bandwidth management. Services policers that enforce SLAs for the above-mentioned types of Layer 2 technologies are well understood, implemented and deployed in known networks. For example, ATM Generic Cell Rate Algorithm (GCRA) policers implement policing on a per Virtual Connection/Virtual Path (VC/VP) basis. Based on preset criteria, an ATM cell received at a GCRA policer at a service provider edge device may be either transmitted into the shared network infrastructure or discarded.

However, as service providers evolve and the services provided change and improve, there may be a requirement for an improved services policer.

SUMMARY

A multi-staged services policer implements multiple policies, at an edge device of network, on the data traffic of a single customer. Such a policer is important, in particular, as service providers start offering Virtual Private Networking (VPN) services on Layer 2 technologies other than ATM and Frame Relay. Additionally, service providers may start offering VPN services on the IP layer and, in such cases, may wish to police with Layer 7 granularity, that is, police based on end user applications.

In accordance with an aspect of the present invention there is provided a multi-staged services policer. The multi-staged services policer includes a downstream services policer and an upstream services policer. The upstream services policer adapted to: receive a traffic unit; analyze the traffic unit; based on the analysis, transmit the traffic unit to the downstream services policer; and receive feedback from the downstream services policer.

In accordance with another aspect of the present invention there is provided a method of handling traffic units. The method includes receiving a traffic unit, analyzing the traffic unit, based on the analysis, transmitting the traffic unit to a downstream services policer and receiving feedback from the downstream services policer. In a further aspect of the invention, a computer readable medium is provided to allow a general purpose computer to perform this method.

In accordance with a further aspect of the present invention there is provided a multi-staged services policer. The multi-staged services policer includes a downstream services policer and an upstream services policer. The upstream services policer is adapted to: receive a traffic unit; analyze the traffic unit; based on the analysis, amend the traffic unit resulting in an amended traffic unit including an amendment, where the amendment may be interpreted by the downstream services policer; and transmit the amended traffic unit to the downstream services policer.

In accordance with a further aspect of the present invention there is provided a multi-staged services policer including a first services policer, a second services policer and a third services policer receiving output from each of the first services policer and the second services policer.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
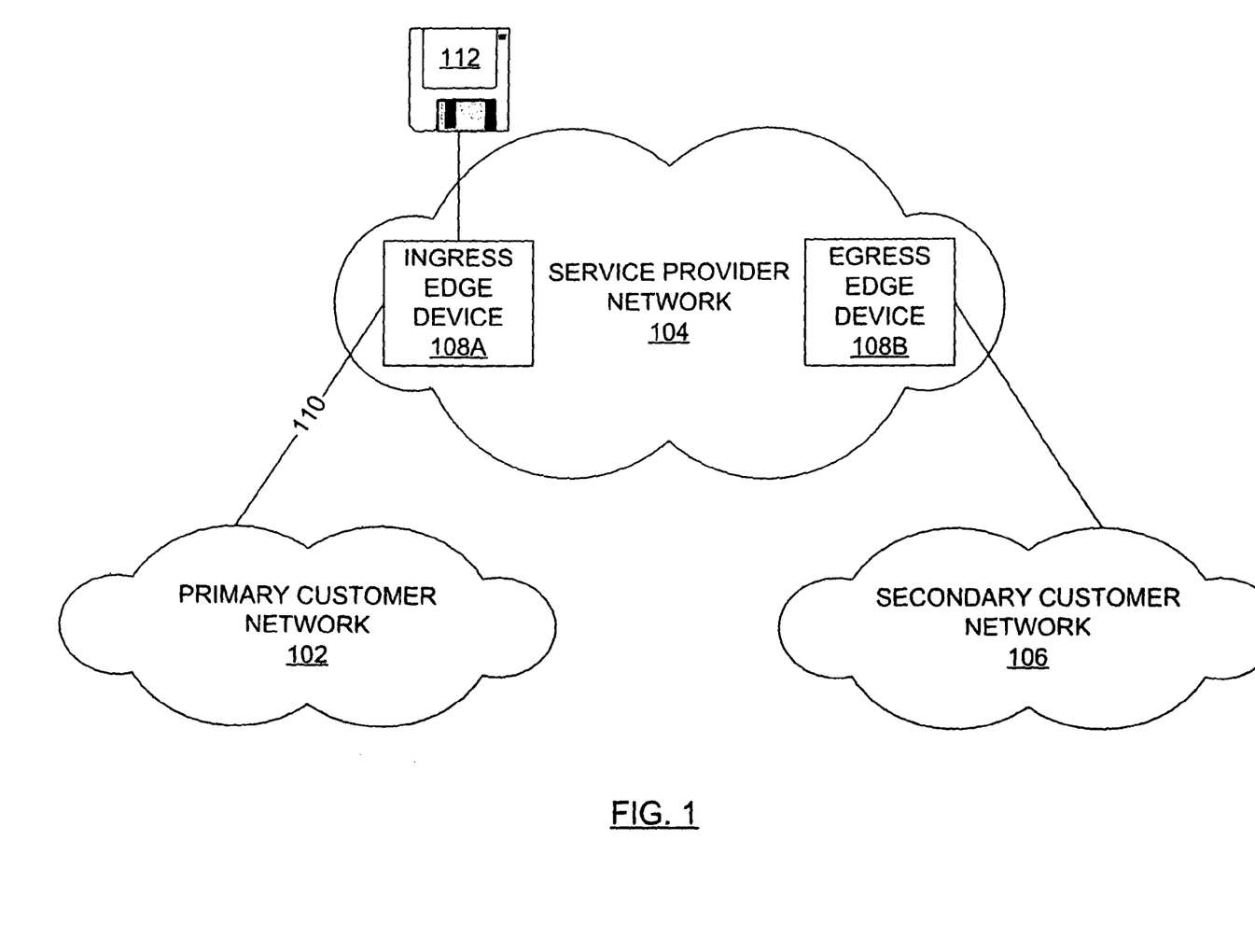
FIG. 1 illustrates a connection between a primary customer network and an edge device in a service provider network.

In a service provider network 104, such as is illustrated in FIG. 1, it is common for the service provider responsible to provide a single access point to the service provider network 104. As illustrated, this access point is an ingress edge device 108A. To provide services policing on a connection between a primary customer network 102 and a secondary customer network 106 through the service provider network 104, a services policer may be included in the ingress edge device 108A. Such a services policer may, for instance, limit traffic having a given Class of Service (CoS).

An egress edge device 108B is provided to receive traffic from the ingress edge device that is destined for the secondary customer network 106 and transmit the traffic to the secondary customer network 106.

As stated hereinbefore, a services policer may be implemented in application-specific hardware. However, in an alternative implementation, the ingress edge device 108A may be loaded with services policing software for executing methods exemplary of this invention from a software medium 112 which could be a disk, a tape, a chip or a random access memory containing a file downloaded from a remote source.

CoS is a type of criterion used when managing traffic in a network by grouping similar types of traffic (for example, e-mail, streaming video, voice, large document file transfer) together and treating each type as a class with its own level of service priority. Unlike Quality of Service (QoS) traffic management, Class of Service technologies do not guarantee a level of service in terms of bandwidth and delivery time; they offer a "best-effort". On the other hand, CoS technology is simpler to manage and more scalable as a network grows in structure and traffic volume. One can think of CoS as "coarsely-grained" traffic control and QoS as "finely-grained" traffic control.

Figure 2:
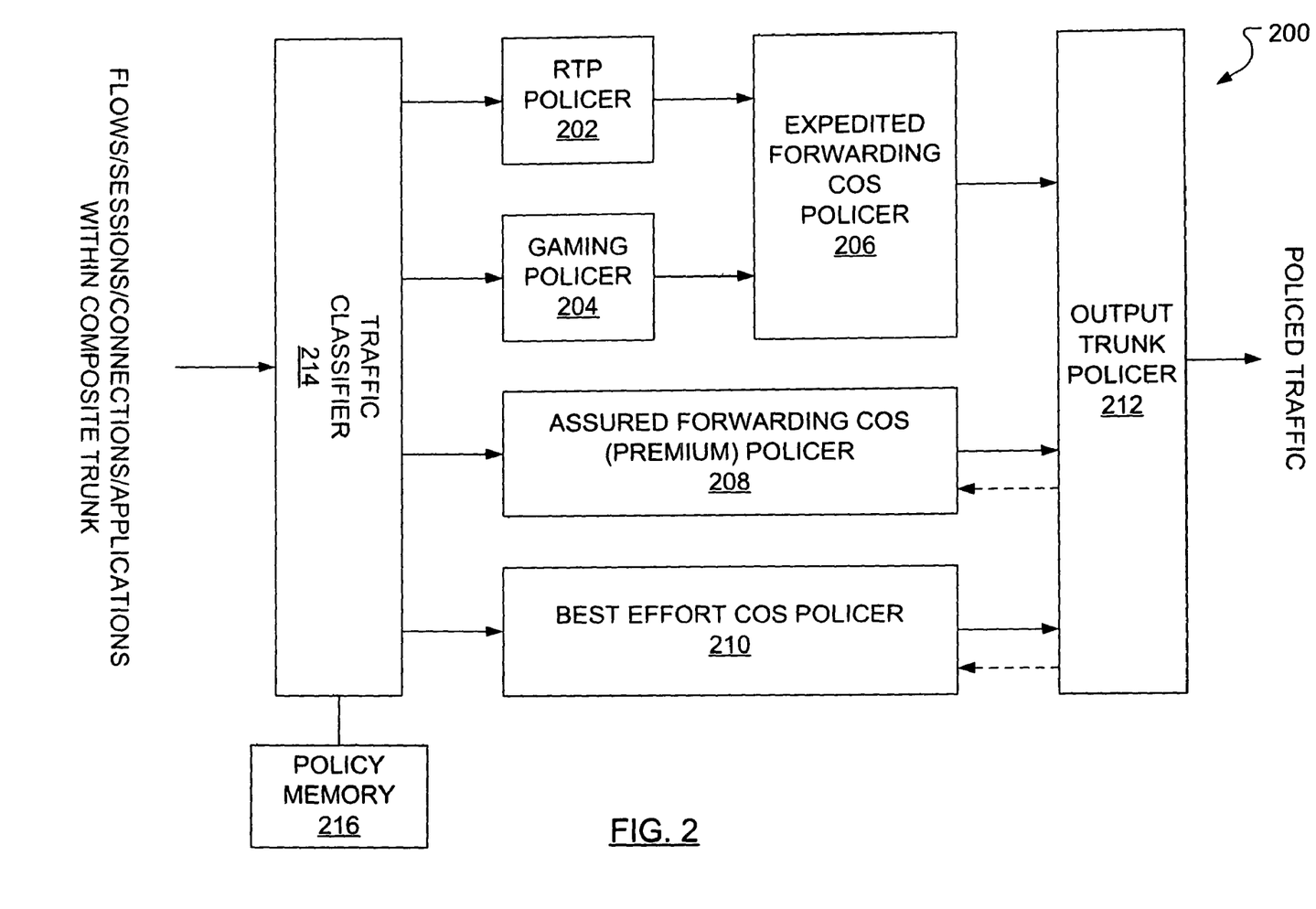
FIG. 2 illustrates a multi-staged services policer present at the edge device of FIG. 1 according to an embodiment of the present invention.

FIG. 2 illustrates an exemplary architecture for a multi-staged services policer 200 organized as a matrix of services policer blocks. Dependent on the type of data traffic arriving at the service provider edge device, an input trunk may supply the multi-staged services policer 200 with traffic defined as a flow, a session, a connection, an application, etc. The unit of data traffic is also dependent on the type of data traffic. For instance, the traffic unit for ATM traffic is a cell, the traffic unit for Frame Relay traffic is a frame and the traffic unit for IP traffic is a packet. Each traffic unit may have some aspects in common that may be used by the various services policers when determining whether to discard or transmit the traffic unit.

As illustrated in FIG. 2, a Real-time Transport Protocol (RTP) policer 202 and a Gaming policer 204 receive traffic units specific to their class of service and each pass output traffic units to an Expedited Forwarding (EF) CoS policer 206. Output from an Assured Forwarding (AF) CoS policer 208 and a Best Effort CoS policer 210 join the output from the EF CoS policer 206 in being received by an output trunk policer 212. The output trunk policer 212 may then produce output traffic that reflects the SLA between the service provider and the customer at the source of the input trunk. A traffic classifier 214 is provided to examine each traffic unit in an incoming flow of traffic units and send the traffic units to appropriate policers. The criteria on which the traffic classifier 214 bases the decision to send a given traffic unit to a particular services policer may be based on a policy stored in a policy memory 216 to which the traffic classifier has access. The criteria, where the traffic unit is an IP packet, may, for instance, include source IP address, destination IP address and Differentiated Services Code Point. The traffic classifier 214 may also restrict access to the multi-staged services policer 200 according to an Access Control List (ACL).

The Real-Time Transport Protocol (RTP) is an Internet protocol standard that specifies a way for programs to manage the real-time transmission of multimedia data over either unicast or multicast network services. Originally specified in Internet Engineering Task Force (IETF) Request for Comments (RFC) 1889, RTP was designed by the IETF Audio-Video Transport Working Group to support video conferences with multiple, geographically dispersed participants. RTP is commonly used in Internet telephony applications and does not in itself guarantee real-time delivery of multimedia data (since this is dependent on network characteristics). RTP does, however, provide the wherewithal to manage the data as it arrives to best effect.

Figure 3:
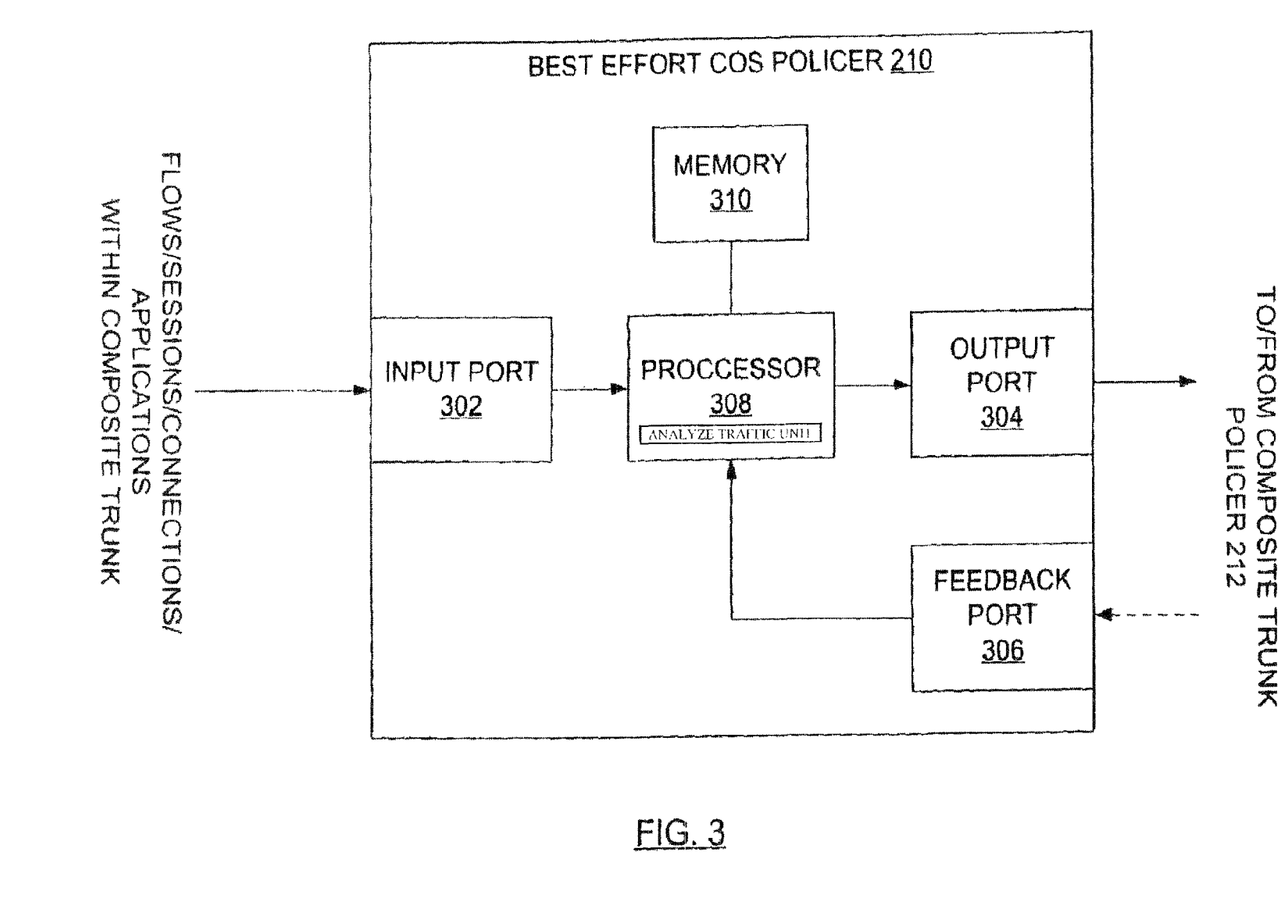
FIG. 3 illustrates one of the services policers of the multi-staged services policer of FIG. 2.

FIG. 3 illustrates an exemplary one of the services policers that make up the multi-staged services policer 200 of FIG. 2. In particular, an exemplary architecture for the Best Effort CoS policer 210 is illustrated. The exemplary architecture includes an input port 302 for receiving traffic units from the traffic classifier 214. A processor 308 receives the traffic units from the input port 302. The exemplary architecture further includes a memory 310 for storing the criteria based on which an analysis may be carried out on the traffic units by the processor 308. An output port 304 is included for transmitting traffic units, after the analysis by the processor 308, to the output trunk policer 212. A feedback port 306 in included for receiving information from the output trunk policer 212 and passing the information to the processor 308.

As will be apparent to a person skilled in the art, although the schematic representation of the Best Effort CoS policer 210 illustrated in FIG. 3 appears to be hardware-based, an individual policer may be implemented in software or by an application specific integrated circuit (ASIC), among other implementations.

In overview, aspects of the present invention involve arranging a group of services policers in stages in order to implement multiple policies on the data traffic of a single customer. When services policers are arranged in stages, one services policer precedes another and, as such, there is at least one upstream services policer and at least one downstream services policer. Advantageously, the downstream services policer may provide the upstream services policer with information valuable in analyzing incoming traffic units for compliance with an SLA. The group of services policers may be arranged in a cascade, in parallel or combination. In addition, the group of services policers may be distributed among multiple elements of an edge device.

In general, the upstream services policer receives a traffic unit, whether that traffic unit is an ATM cell, a Frame Relay frame, an IP packet or some other type of traffic unit. The upstream services policer then analyzes the traffic unit. Such an analysis is performed to extract information from the traffic unit, such as an identity of the flow to which the traffic unit belongs or, as will be discussed further hereinafter, the application type to which the traffic unit relates. Based on this analysis, the upstream services policer may then transmit the traffic unit to the downstream services policer. Before transmitting the traffic unit, the upstream services policer may mark the traffic unit in a manner that will be understood by the downstream services policer. Alternatively, the upstream services policer may discard the traffic unit. Similarly, upon receiving the traffic unit from the upstream services policer, the downstream services policer analyzes the traffic unit and acts on (transmits, marks, discards) the traffic unit accordingly.

It may be arranged that the downstream services policer can transmit information (feedback) back to the upstream services policer. Such information may relate to the state of a network to which the downstream services policer is connected or may relate to other traffic units from the same user handled by other upstream services policers. As such, the upstream services policer may receive feedback from the downstream services policer. Based on the feedback, the upstream services policer may act upon future traffic units differently than it would have in the absence of the feedback.

The multi-staged services policer 200 of FIG. 2 is arranged to satisfy an example service implementation, wherein a user of a given service provider purchases a single 100 Mbit/s block of aggregate Level 2 services on a trunk with an SLA including: 20 Mbit/s Voice over IP (VoIP) RTP traffic, 5 Mbit/s gaming traffic, 40 Mbit/s Premium traffic and the remainder Best Effort traffic. According to the SLA, the RTP traffic and the gaming traffic may be handled by the services policer 200 as Expedited Forwarding (EF) traffic, the Premium traffic may be handled by the services policer 200 as Assured Forwarding (AF) traffic and the remainder of the traffic may be handled by the services policer 200 as Best Efforts traffic.

The traffic classifier 214 in use for such an implementation may examine the contents of each received traffic unit for an indication of whether the traffic unit is carrying RTP traffic or gaming traffic. Based on such an indication the traffic classifier may forward the traffic unit to the appropriate services policer. It may be that the customer has marked some traffic units with an indication that the marked traffic units should receive a "Premium" treatment by the service provider. The traffic classifier may be arranged to forward traffic units with such a marking to the EF CoS policer 206. Additionally, the traffic classifier may be arranged to forward all traffic units that are not marked Premium or recognizable as RTP or gaming traffic to the Best Effort CoS policer 210.

Where a services policer has been provisioned to limit traffic of a certain type, part of the provisioning is an establishment of rules for actions to be performed after the limit has been reached. Typical known services policers discard traffic units that arrive once a limit has been reached. The multi-staged approach of the present invention allows for the marking of traffic at one stage so that the traffic may be processed in a predetermined manner at a downstream stage.

The RTP policer 202 may be adapted to mark traffic units that are received before the 20 Mbit/s contracted limit is reached in one way and mark traffic units that are received after the 20 Mbit/s contracted limit is reached in another way. This marking may be unique to the RTP policer 202 or may be unique to the entire multi-staged services policer 200. Where the marking is unique to the RTP policer 202, the EF CoS policer 206 may be able to recognize the marking.

Consider a scenario in which the RTP policer 202 marks traffic units that are received before the 20 Mbit/s contracted limit is reached with "R1" and marks traffic units that are received after the 20 Mbit/s contracted limit is reached with "R0". Similarly, gaming traffic received before the 5 Mbit/s limit is reached may be marked "G1" and over limit traffic units may be marked "G0". Such marking offers the EF CoS policer 206 some flexibility in marking traffic units that are forwarded to the output trunk policer 212.

In general, according to the implementation of the SLA, the EF CoS policer 206 may be arranged to mark traffic units received before the pre-set limit of 25 Mbit/s is reached with "E1". There may be many options for the marking of the traffic units received after the pre-set limit of 25 Mbit/s is reached. These options may be decided upon as part of the SLA between the customer and the service provider yet not discussed thus far. For instance, it may be that the EF traffic units exceeding the pre-set limit are to be dropped. However, as it has been determined that the EF traffic units are more important than the AF traffic units, excess EF traffic units may be marked "A1" so that the excess EF traffic units are treated by the output trunk policer 212 as AF traffic units.

Additionally, the EF CoS policer 206 may be arranged to prioritize the R0 and G0 traffic units received from the preceding services policers. Rather than simply translating the marking on the R0 and G0 traffic units to E0. Where the pre-set limit has not been reached, the EF CoS policer 206 may mark R0 traffic units with E1 until the limit is reached. If the limit is still not reached with the received R0 traffic units, G0 traffic units may then be marked E1 until the limit is reached.

Traffic units marked by the customer as Premium that are received before the contracted limit (40 Mbit/s according to the exemplary SLA) is exceeded may be marked "A1" by the AF CoS policer 208 and passed to the output trunk policer 212. Where excess EF traffic units have been marked "A1" as discussed above, the 40 Mbit/s limit may be reached before 40 Mbit/s of traffic units marked by the customer as Premium are received. A feedback route from the output trunk policer 212 to the AF CoS policer 208 may be provided, as shown in FIG. 2, to inform the AF CoS policer 208 of the quantity of AF traffic units that have already been received by the output trunk policer 212. The AF CoS policer 208 may mark traffic units received after the limit is reached, however the limit is reached, with "A0".

As mentioned hereinbefore, the Best Effort CoS policer 210 may receive those traffic units that the traffic classifier 214 has determined are not carrying RTP or gaming traffic and, further, are not marked as Premium by the customer. The manner in which best effort traffic units are handled by the Best Effort CoS policer 210 may be consistent with the manner in which corresponding traffic units are handled by the EF CoS policer 206 and the AF CoS policer 208. That is, traffic units received before a limit is reached are marked with "B1" and traffic units received after the limit is reached are marked with "B0". However, the limit is not pre-set. The limit is based on the amount of traffic received at the output trunk policer 212 from the EF CoS policer 206 and the AF CoS policer 208. An indication of the remaining portion of the contracted total of 100 Mbit/s may be transmitted by the output trunk policer 212 to the Best Effort CoS policer 210 over a feedback path illustrated in FIG. 2.

Returning to the operation of the AF CoS policer 208, traffic units received after the limit is reached, may be marked with B1 to indicate that the traffic units are to be considered best effort traffic by the output trunk policer 212.

In one alternative embodiment, the Best Effort CoS policer 210 may mark traffic units received before the limit is reached with "B" and may discard any traffic units received after the limit is reached.

It is then the task of the output trunk policer 212 to forward received traffic units onto the service provider network 104 (FIG. 1). The output trunk policer 212 may have buffers in which to organize received traffic units. For instance, the output trunk policer 212 may have a buffer for traffic units marked E1, a buffer for traffic units marked A1, a buffer for traffic units marked B1 and may simply discard traffic units marked B0.

It may be noted that, as the multi-staged services policer 200 of FIG. 2 will not always be policing EF and AF traffic at their respective full contracted capacities, traffic identified as "Best Effort" may be permitted to burst up to 100 Mbit/s.

Most current services policers operate on a binary, or "black and white", basis wherein a traffic unit is either allowed to pass through or is discarded. The multiple stages of services policers contemplated by the present invention allow for many more types of service to be considered. Rather than a black and white policing model, the policing model offered by the multi-staged services policer 200 of FIG. 2, in operation as described hereinbefore, may be said to be multicolored, where the "colors" of service are E1, A1 and B1.

As stated hereinbefore, known ATM GCRA policers police on a per VC/VP basis. In contrast, aspects of the present invention can be applied per ATM VC/VP in addition to being applied per Data-link Connection Identifier (DLCI) in a network using Frame Relay and per Label Switched Path (LSP) in a network using IP and Multi-Protocol Label Switching (MPLS), among other applications.

Where the invention is implemented in an edge router, aspects of the architecture of the edge router may be interwoven with the operation of the multi-staged policer. A typical edge router has an array of input line cards, an array of output line cards and a switching fabric for controllably switching traffic units received at a given input line card to a given output line card. Rather than providing all of the services policing capabilities of the multi-staged policer of the present invention in one location within the edge router, the stages may be distributed such that some stages are associated with an input line card and some stages are associated with an output line card. As such certain of the policing functions may be specific to a customer from which the traffic units are received and certain of the policing functions my be specific to the destination of the traffic units.

Even beyond distributing policing across an edge device, policing may be distributed across the service provider network 104 of FIG. 1. Initial policing may take place at the ingress edge device 108A and final policing may take place at the egress edge device 108B.

While it has been discussed hereinbefore that traffic units may be distinguished, or classified, by the traffic classifier 214 based on a type of content or a marking placed in the traffic unit by the customer. It is also contemplated that traffic may be prioritized by the port on which the traffic unit arrives at the edge device employing an aspect of the present invention. For instance, a single customer may have more than one link to a service provider edge device. The customer may place higher priority traffic units on a particular link or set of links. Further alternatively, where a service provider employs a single multi-staged service policer to police traffic units received from a number of customers, the above mentioned port-based services policing may be used to give certain of the customers (say, those that pay their bills on time) priority over certain others of the customers (say, those whose accounts are in arrears).

While in the exemplary multi-staged services policer discussed hereinbefore, three "colors" of service were considered, as will be apparent to a person skilled in the art, many more may be contemplated. For instance, precedence flags numbered 0-9 may be used to give ten colors of service.

Concepts similar to such precedence flags may known from other, related networking technologies. For instance, wired Ethernet includes support for Quality of Service (QoS) in the form of 802.1p packet tagging based on the IEEE 802.1D specification, which defines the addition of four bytes to the legacy Ethernet frame format. The defined priority tagging mechanism is known as IEEE 802.1p priority tagging, and it allows for eight levels of priority.

It may be then, that traffic units arrive at a multi-staged services policer with eight levels of priority. It may also be that the traffic units depart the multi-staged services policer with eight levels of priority. However, the levels may not map directly. For instance, if three of eight levels of priority at the output of the multi-staged services policer are reserved for some reason, the eight levels of priority of the incoming traffic units must be mapped to the remaining five levels of priority available in the multi-staged services policer. By appropriately programming individual services policers within the multi-staged services policer, such a mapping may be accomplished.

As discussed hereinbefore, services policing is not limited to an ingress edge device. At an egress edge device, policing task that may be assigned to a services policer is monitoring of traffic for evidence of a denial of service (DoS) attack. A denial of service (DoS) attack is an incident in which a user or organization is deprived of the services of a resource they would normally expect to have. One of the most dangerous forms of Denial of Service attacks is a SYN Attack. Under normal circumstances a computer that initiates a communication session (an initiator) sends a TCP SYN synchronization packet to a receiving server. The receiving server sends back a TCP SYN-ACK packet and then the initiator responds with an ACK acknowledgment. After this handshake, both parties are set to send and receive data.

A SYN Attack floods a targeted system with a series of TCP SYN packets. Each TCP SYN packet causes the targeted system to issue a SYN-ACK response. While the targeted system waits for the ACK that should follow the SYN-ACK, the targeted system queues up all outstanding SYN-ACK responses on what is known as a backlog queue. This backlog queue has a finite length that is usually quite small. Once the backlog queue is full, the targeted system will ignore all incoming TCP SYN packets. SYN-ACKs are moved off the queue only when an ACK comes back or when an internal timer (which is set to a relatively long interval) terminates the three-part handshake.

A SYN Attack creates each SYN packet in the flood with a "bad" source IP address, which identifies the original packet. A source IP address is "bad" if it either does not actually exist or is down. All SYN-ACK responses are sent to the source IP address. Therefore, the ACK that should follow a SYN-ACK response will never come back. This creates a backlog queue that is always full, making it nearly impossible for legitimate TCP SYN requests to get into the system. DoS attacks early in the year 2000 disabled several major web sites.

A services policer specifically designed to detect a DoS attack may be arranged to count SYN packets that pass through and discard SYN packets that exceed a pre-set limit in a set time period.

It is an advantage of the multi-staged services policing approach described herein that multiple algorithms may be used to police a given flow of traffic, rather than the single algorithm familiar from use of conventional ATM GCRA policers.

As will be apparent to a person skilled in the art, the traffic classifier 214 (FIG. 2) may be considered a special case of a services policer. Further, the traffic classifier, or an individual services policer, of a given multi-staged services policer employing an aspect of the present invention may look more closely at traffic units than has been previously contemplated in conjunction with Layer 2 policers. In particular, service policing may be performed with a Layer 7 granularity. "Layer 7" is the Application layer of the previously-referenced OSI communication model concerned with end user services. Examples of such services include data traffic using the Simple Mail Transfer Protocol (SMTP), the Hyper-Text Transfer Protocol (HTTP), the Telnet standard, the File Transfer Protocol (FTP), the rlogin standard and the Network File System (NFS) standard. For example, a services policer that is policing at Layer 7 granularity can distinguish World Wide Web traffic (HTTP) from VoIP traffic, and police accordingly. Further, policing, or traffic classification, may be performed based upon "cookies" that may be part of an exchange of HTTP traffic between a client computer in a customer network and a server computer accessed through the service provider network.

Other modifications will be apparent to those skilled in the art and, therefore, the invention is defined in the claims.

We claim:

1. A multi-staged services policer comprising:
   one or more processors;
   a downstream services policer;
   a first upstream services policer to:
   receive a traffic unit;
   analyze said traffic unit;
   based on said analysis, transmit said traffic unit to said downstream services policer; and
   receive feedback from said downstream services policer; and
   a second upstream services policer to transmit traffic units received at said second upstream services policer to said downstream services policer based on an analysis specific to said second upstream services policer,
   wherein said downstream services policer is configured to afford a higher priority to traffic units received from said second upstream services policer than to traffic units received from said first upstream services policer.

2. The multi-staged services policer of claim 1 wherein said feedback from said downstream services policer is an indication of available bandwidth.

3. The multi-staged services policer of claim 1 wherein at least one of said services policers is configured to police at an application layer granularity.

4. The multi-staged services policer of claim 1 wherein at least one of said services policers is configured to police at a data link layer granularity.

5. The multi-staged services policer of claim 1 wherein said traffic unit is a Frame Relay frame.

6. The multi-staged services policer of claim 1 wherein said traffic unit is a Internet protocol packet.

7. A method of handling traffic units comprising:
   receiving, by a first upstream services policer, a first traffic unit;
   analyzing, by the first upstream services policer, said first traffic unit according to a first policy;
   based on said analysis, transmitting, by the first upstream services policer, said first traffic unit to a downstream services policer;
   processing, by the downstream services policer, the first traffic unit according to a second policy;
   receiving, by the first upstream services policer, feedback from said downstream services policer to cause the first upstream services policer to modify analysis by the first upstream services policer of further received traffic units;
   receiving a second traffic unit by a second upstream services policer;
   analyzing, by the second upstream services policer, said second traffic unit according to a third policy;
   based on said analysis of said second traffic unit, transmitting, by the second upstream services policer, said second traffic unit to the downstream services policer,
   wherein said downstream services policer affords a higher priority to traffic units received from said second upstream services policer than to traffic units received from said first upstream services policer.

8. The method of claim 7 further comprising:
   receiving, by the first upstream services policer, a third traffic unit;
   analyzing, by the first upstream services policer, said third traffic unit differently from the analyzing of the first traffic unit in light of said feedback; and
   based on said analysis of said third traffic unit, transmitting said third traffic unit to said downstream services policer.

9. A computer readable storage medium embodied with computer-executable instructions which, when executed by a processor in an upstream services policer that is upstream of a downstream services policer, cause the processor to:
   receive a first traffic unit;
   analyze said first traffic unit according to a first policy regarding processing of data traffic received by the upstream services policer;
   based on said analysis, transmit said first traffic unit to said downstream services policer that processes data traffic received by said downstream services policer according to a second, different policy;
   receive feedback from said downstream services policer;
   receive a second traffic unit;
   in response to the received feedback, analyze said second traffic unit differently from analysis of said first traffic unit; and
   based on said analysis of said second traffic unit, transmit said second traffic unit to said downstream services policer.

10. A multi-staged services policer comprising:
    one or more processors;
    a first services policer to police traffic units according to a first policy for a first class of service;
    a second services policer to police traffic units according to a second policy for a second class of service; and
    a third services policer to receive output from each of said first services policer and said second services policer, wherein the third services policer is configured to afford a higher priority to traffic units received from the first services policer than to traffic units received from the second services policer.

11. The multi-staged services policer of claim 1, wherein the first upstream services policer is to use the feedback from the downstream services policer to cause the first upstream services policer to modify analysis of further traffic units received by the first upstream services policer.

12. A multi-staged services policer comprising:
    one or more processors;
    a downstream services policer;
    a first upstream services policer to:
    receive a first traffic unit;

analyze said first traffic unit according to a first policy;
based on said analysis, transmit said first traffic unit to said downstream services policer; and
receive feedback from said downstream services policer, wherein the first upstream services policer is to use the feedback from the downstream services policer to cause the upstream services policer to modify analysis of further traffic units received by the upstream services policer; and a second upstream services policer to receive second traffic units, analyze the second traffic units according to a second policy, and based on the analysis according to the second policy, transmit the second traffic units to the downstream services policer, wherein the feedback received by the first upstream services policer from the downstream services policer is in response to receipt of the second traffic units from the second upstream services policer.

13. A multi-staged services policer comprising:
one or more processors;
a first downstream services policer; and
a first upstream services policer to:
  receive a first traffic unit;
  analyze said first traffic unit according to a first policy;
  based on said analysis, transmit said first traffic unit to said first downstream services policer; and
  receive feedback from said first downstream services policer;
a second upstream services policer to receive second traffic units, analyze the second traffic units according to a second policy, and based on the analysis of the second traffic units, transmit the second traffic units to the first downstream services policer;

a second downstream services policer; and
a third upstream services policer to receive third traffic units, analyze the third traffic units according to a third policy, and based on the analysis of the third traffic units, transmit the third traffic units to the second downstream services policer,
wherein the first, second, and third policies are for different types of traffic units.

14. The multi-staged services policer of claim 10, wherein the third services policer is to send feedback information to the first services policer in response to the traffic units from the first services policer, wherein the first services policer is configured to respond to the feedback information by modifying analysis of further traffic units received by the first services policer.

15. The multi-staged services policer of claim 10, wherein the third services policer is configured to send feedback information to the second services policer in response to traffic units received from the first services policer, wherein the second services policer is configured to modify analysis of further traffic units received by the second services policer in response to the feedback information.

16. The multi-staged services policer of claim 1, wherein the downstream services policer includes a first of the processors, the first upstream services policer includes a second of the processors, and the second upstream services policer includes a third of the processors.

17. The multi-staged services policer of claim 1, wherein the downstream and first and second upstream services policers are executable on the one or more processors.

18. The method of claim 7, wherein each of the downstream services policer and first and second upstream services policers includes one or more processors.

* * * * *